United States Patent [19]

Takubo et al.

[11] Patent Number: 4,666,649
[45] Date of Patent: May 19, 1987

[54] METHOD OF AND APPARATUS FOR EXTRUDING THERMOPLASTIC RESIN

[75] Inventors: Toyokazu Takubo; Atsushi Fujii, both of Chiba, Japan

[73] Assignee: Idemitsu Petrochemical Co., Ltd., Tokyo, Japan

[21] Appl. No.: 809,555

[22] Filed: Dec. 16, 1985

[30] Foreign Application Priority Data

Dec. 19, 1984 [JP] Japan ................................ 59-266398

[51] Int. Cl.⁴ .......................................... B29C 47/64
[52] U.S. Cl. .............................. 264/176.1; 264/102; 264/349; 425/203; 425/208
[58] Field of Search ................... 264/176 R, 349, 102; 425/203–207, 208, 7.1, 376 B

[56] References Cited

U.S. PATENT DOCUMENTS

| | | | |
|---|---|---|---|
| 2,705,131 | 3/1955 | Ross et al. | 425/207 |
| 4,006,209 | 2/1977 | Chiselko et al. | 264/349 |
| 4,099,897 | 7/1978 | Takano et al. | 425/208 |
| 4,107,260 | 8/1978 | Dougherty | 264/349 |
| 4,243,629 | 1/1981 | Tramezzani | 264/176 R |
| 4,255,379 | 3/1981 | Frankland, Jr. | 425/208 |
| 4,329,313 | 5/1982 | Miller et al. | 264/176 R |
| 4,461,734 | 7/1984 | Jones et al. | 264/176 R |
| 4,548,778 | 10/1985 | Fujii | 425/71 |

FOREIGN PATENT DOCUMENTS 53-27658  3/1978  Japan .................................. 425/207

Primary Examiner—Jeffery Thurlow
Attorney, Agent, or Firm—Flynn, Thiel, Boutell & Tanis

[57] ABSTRACT

A method of extruding thermoplastic resin by use of an extruder, wherein the thermoplastic resin is continuously passed through a compression moderating type resin feeding-melting section, a resin flow disturbing section and a resin stress relaxing section, and extruded through a die. In an apparatus for working this method, a helical screw of the extruder is provided with the resin feeding-melting section, the resin flow disturbing section and a transfer section for relaxing the resin stress.

17 Claims, 4 Drawing Figures

METHOD OF AND APPARATUS FOR EXTRUDING THERMOPLASTIC RESIN

BACKGROUND OF THE INVENTION

1. Field of the Invention

This invention relates to a method of extruding thermoplastic resin and an apparatus therefor, and more particularly to a method of extruding thermoplastic resin, wherein heat generated by viscous energy dissipation of the resin is low, quantitatively stabilized and high speed extrusion of the resin can be effected at low resin temperature and low resin pressure, and the extruded resin thus obtained is excellent in transparency and gloss, and an apparatus therefor.

2. Description of the Prior Art

To mold the thermoplastic resin into a film, a sheet or a blow molding article, there have heretofore been many cases where the thermoplastic resin is supplied to an extruder having as its principal elements a cylinder and a screw rotating in the cylinder, the resin is continuously heated, melted, kneaded and finally extruded through a die of a predetermined shape.

Screws of various types are known as ones used in the extruder used according to this exclusive method. For example, the screws generally known include: one of the metering type, in which the depth of screw channel rapidly changes in the longitudinal direction thereof; one of the type, in which the depth of the screw channel is progressively decreased and the pitch is formed at a predetermined interval; one of the type, in which the depth of screw channel is constant and the pitch is progressively decreased; and one of the type, in which the screw is provided at the forward end thereof with a torpedo head or a Dulmage head.

All of the constructions of the above-described screw are designed with the main purpose of fully effecting the kneading of the molten resin, whereby the compression ratio is high. Therefore, as for the kneading, the constructions of the screw are effective, however, on the other hand, the following disadvantages will be derived.

In short, the fully effected kneading during the high speed extrusion presents such disadvantages that the resin is subjected to a high shear stress and the resin temperature is raised, whereby the resin is lowered in its viscosity, so that the resin properties are deteriorated, further, the properties of products are deteriorated and the extruding stability is lowered, thereby enabling to stably obtain the satisfactory products. Furthermore, in the case of the high speed extrusion, the driving force required for driving the screw is high, whereby this driving force causes the resin temperature to be raised. In consequence, in order to prevent the resin temperature from being overheated, it becomes necessary to cool the resin from the outside. These problems are highly disadvantageous in that undesired equipment for energy saving and cooling is required.

Particularly, these problems are severe in the case of the thermoplastic resins, showing the Newtonian properties (showing a relatively high melting viscosity under high shear rate) caused by a relatively narrow molecular-weight distribution, and including polypropylene, linear low density polyethylene, polycarbonate, polystyrene and the like.

To solve the above-described problems, there have recently been proposed a method of using a screw being low in compression ratio, particularly, having a compression ratio of 1 or less, and a method of using a two-stage screw.

According to the former method, high shear of the resin can be certainly avoided, however, on the other hand, uniform melting, deaerating and high-speed stable extrusion of the resin cannot be performed, so that stabilized part quality cannot be obtained. As a consequence, it cannot be said that this method is practicable. According to the latter method, an ordinary screw is formed into two-staged ones, which are mainly used in a vent type extruder. However, in this vent type extruder, kneading portions such as a torpedo head or a Dulmage head, where high shear occurs, are provided on the forward end portions of respective stage screws, and this vent type extruder is not substantially different from the ordinary extruders.

As described above, according to any one of these practicable methods of the prior art, anyway, such extruders are used, in each of which high shear occurs at the forward end portion of the screw, and moreover, the resin pressure is raised. As a consequence, according to these extruding methods, the resin pressure and the resin temperature become relatively high, and the resin is extruded from a die with the shear stress caused by the shearing in the extruder being not relaxed, whereby the swell occurs at the die outlet. Deformation due to this die swell and cooling of the molten resin occur simultaneously, whereby the surface conditions of the molten resin are deteriorated, so that such satisfactory extruded stocks being excellent in transparency and surface gloss and low in swell have not been obtainable. As a consequence, when this extruded stock is formed and cooled to provide a film, a sheet, a hollow container or the like, a satisfactory product has not always been obtained.

SUMMARY OF THE INVENTION

The present invention has been developed to obviate the above-described disadvantages in the conventional method of extruding the thermoplastic resin and apparatus therefor, and has as its object the provision of a method of extruding the thermoplastic resin, wherein the heat generated by viscous energy dissipation is low, the quantitatively constant, stable and high-speed extrusion of the resin can be effected at low resin temperature and pressure, the die swell of an extruded article is low, and the extruded article being excellent in transparency and gloss can be obtained, and an apparatus therefor.

The extruding method according to the present invention features that, in a method of extruding the thermoplastic resin in the molten state by use of an extruder comprising a screw and a cylinder, the thermoplastic resin is passed through compression moderating type resin feeding-melting section, subsequently, passed through a resin flow disturbing section, thereafter, passed through a resin stress relaxing section, and extruded through a die.

Furthermore, the extruding apparatus according to the present invention features that the apparatus is a thermoplastic resin extruding apparatus comprising a screw and a cylinder, and further including: a resin feeding-melting section having a compression moderating type helical screw; a resin flow disturbing section succeeding thereto; a transfer section provided therebehind, for relaxing the resin stress; and a die.

Firstly, the thermoplastic resins used in the present invention need not necessarily be limited particularly, and, for example, include high-density polyethylene, high-pressure-produced low-desnity polyethylene, linear low-density polyethylene, polypropylene, copolymer between ethylene, propylene and another α-olefin, polystyrene, polyamide, polyester, polycarbonate, polyvinyl chloride, polyacrylonitrile, polyvinylidene chloride, polyphenylene oxide, polyimide, polysulfone, polyphenylene sulfide, and polyketone. The present invention can be adequately applied to the thermoplastic resins indicating the Newtonian shear properties (indicating a relatively high melting viscosity under a rate of high shear) caused by such a factor that the molecular-weight distribution is relatively narrow. This is because these resins have high viscosity in the region of high shear in the extruder, whereby the screw driving consumption rate becomes high to extrude these high viscosity resins, so that the extruding productivity becomes low, thus raising the manufacturing cost. Further, with the resins low in heat stability, due to the rise in the resin temperature based on the heat generated by viscous energy dissipation, there are possibilities of causing the deterioration and decomposition of the resins.

Another object of the present invention is to improve the transparency, gloss and the like of the molten resin thus extruded. The resins as being the objects include polypropylene random polypropylene, in which α-olefin such as ethylene of 20 wt% or less is copolymerized, and linear low-density polyethylene. It has been very difficult to produce the parts such as a sheet and a film being really excellent in transparency due to the crystallizaton from these resins.

DETAILED DESCRIPTION OF THE PREFERRED EMBODIMENT

Figure 1:
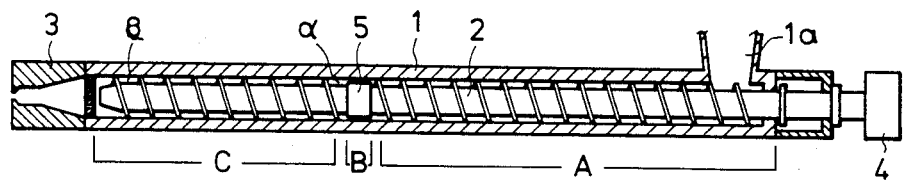
FIG. 1 is a schematic, longitudinal sectional view showing one example of the apparatus according to the present invention.

Description will hereunder be given of the extruding method and the extruding apparatus according to the present invention with reference to the drawings showing one embodiment of the present invention. FIG. 1 is a schematic sectional view showing one embodiment of the extruding apparatus. In the drawing, designated at 1 is a cylinder, and 2 a helical screw rotatable in the cylinder. Attached to one end of the cylinder 1 is a resin feed port 1a, and provided at the other end of the cylinder 1 is a die 3 being of a predetermined shape. The screw is rotated by a driving unit 4 such as a motor.

In the apparatus shown in the drawing, a section A is a resin feeding-melting section. For example, pellets fed through the resin feed port 1a are melted in this section and fed under pressure from the right to the left in the drawing, while being kneaded by the propelling force of the screw 2. There is no particular restriction regarding the extruding apparatus in which the section A is used, only if the extruding apparatus is of a moderate compression type. To be specific, such a helical screw can be exemplified by it having a compression ratio in the range of 0.5 to 2, preferably 0.6 to 1.5. Additionally, in the specification, the term "compression ratio" means "(the depth of the screw channel at the start portion of resin flow-in)/the depth of screw channel at the end portion of resin extrusion)" when the pitch of the screw is constant in each of the sections of construction. The compression ratio of the section A is determined by the type of resin, the rate of extrusion, the condition of the resin flow disturbing section and the like, however, normally, a straight screw with a compression ratio of 1 is used. If the compression ratio exceeds 2 here, the shear stress at the tail end of the section A becomes high to cause an an undesirable raising of the resin temperature and the accumulation of shear stress. When the compression ratio becomes 0.5 or less, it is unfavorable that unnecessary stagnation of the resin is caused and insufficient kneading at the initial stage occurs.

As a consequence, the screw used in the section A may be of any type, only if it is of a compression moderating type, i.e. a straight type, a type of a equidistant pitch and variable in the depth of screw channel, a type of a constant depth of screw channel and variable in the pitch, or a rapid compression type. In any case, in the section A, actions of feeding and melting of the resin are performed, and it is preferable that the resin is transferred to the succeeding stage without giving an excessively strong kneading to the resin.

A section B of the screw is a resin flow disturbing section, where the flow of the molten resin transferred from the section A is resisted and uniform kneading of the resin is carried out by the shear for a relatively short period of time. As a mechanism 5 in the disturbing section, in general, there is arbitrarily disposed a mechanism such as ring valve head, a torpedo head, a Dulmage head, a fluted head, a double helical head, and a polygonal head or the like. However, the mechanism of the disturbing section need not necessarily be limited to the above. Instead, there may be used a combination between an adequate recess construction provided on the inner wall of the cylinder and the mechanism on the screwshaft. Particularly, it is preferable to use equipment wherein a space formed between the screwshaft and the cylinder is varied by the screwshaft being movable axially relative to the ring valve mechanism to thereby make the fluidic resistance regulatable, so that one can select the optimal conditions for the properties of the resin, the rate of extrusion, the physical properties required of the product and the like.

When the resin flow disturbing section is not provided, not only gases contained in the molten resin cannot be satisfactorily deaerated but also the molten resin cannot be extruded from the die under a predetermined condition, thus possibly causing an ununiform section in the produced sheet for example. This fact is apparent from fluctuations in the resin pressure at the inlet of the die in an embodiment and a comparative example to be described hereunder.

The length of this resin flow disturbing section is normally as much as 0.1–3 times the diameter of the cylinder, and the mean section area of the space formed across the screwshaft and the cylinder of this resin flow disturbing section is, for example, as much as $\frac{1}{2}$–1/10 times the mean sectional area of the space across the screwshaft and the cylinder of the resin feeding section, and preferably $\frac{1}{3}$–1/7. However, it is necessary that, as these values, the optimal values depending on the types of resins and the lengths of the sections should be selected. In any case, it is preferable that, as the section B, the extrusion should be made under a condition, where the shear stress is made as low as possible, as far as the the requirements for the deaeration of the molten resin, the uniform kneading and the extruding stability are satisfied. In consequence, the conditions for this section B are restricted under the conditions for a section C, to which the resin is to be transferred subsequently.

Subsequently, the molten resin, which has been uniformly kneaded in the section B, is transferred to the succeeding section C. The section C is a stress relaxing section for the molten resin, for transferring the molten resin, which is transferred from the section B and having therein the residual shear stress, to a die 3, and for relaxing the residual stress of the molten resin. Simultaneously, in this section C, cooling and uniformalizing of the resin are deemed to occur. In consequence, in this section C, in short, the main purpose is to transfer the molten resin to the die to extrude the same through the die at a constant rate, while relaxing the stress of the molten resin. Therefore, it is necessary to use the extruding apparatus having such a construction that high kneading and high shear do not occur therein. As such a construction, there is adopted a helical screw, a rod without helixes, a non-screw portion having only a cylinder, or a combination between the above-mentioned members. For example, there is adopted a helical screw having the compression ratio of 0.5-2.0.

The compression ratio mentioned here is a value indicated by $\beta/\alpha$ in the drawing (the ratio between the space and the sectional area).

Figure 2:
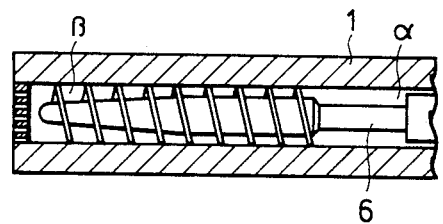
FIGS. 2 and 3 are longitudinal sectional views showing other forms of the section C, respectively.
Figure 3:
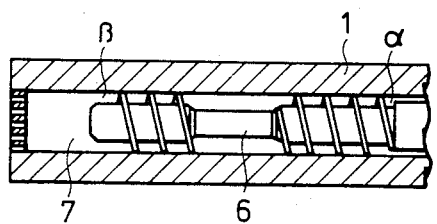

The length of the section C varies from one construction to another. The length should be one which can satisfactorily achieve the relaxation, i.e. normally 4–15 times the diameter of the cylinder. Additionally, other specific forms of the section C are shown in FIGS. 2 and 3. In the drawing, designated at 6 is a rod without helixes and 7 a portion without a screw.

As the resin stress relaxing section, in addition to the mechanism comprising the screw and the cylinder, a pipe and/or a gear pump may be provided between the above-mentioned mechanism and the die.

In the extruding apparatus according to the present invention, a ratio L/D between the total length (L) and the diameter (D) of the cylinder is designed to be 15–35, preferably 20–30. Furthermore, grooved liner can be formed on the inner wall of the cylinder in the axial direction thereof, so that pellets may be smoothly fed.

The foregoing is the detailed description of the extruding method and the extruding apparatus according to the present invention. The constructions of the respective sections and the combinations thereof are determined by the type of the thermoplastic resin to be extruded, type of the product and the melting properties of the article extruded. Particularly, it is preferable that the section C has such a construction or length that the shear stress of the resin can be satisfactorily relaxed. The resin supplied so as to be suited to the function of the section C as described above is melted and low-kneaded in the section A, fed to the section B, subsequently, perfectly and uniformly kneaded in the section B, thereafter, transferred through the section C while the shear stress accumulated therein are relaxed, meltingly extruded into a predetermined form from the die through the pipe and/or the gear pump a necessary, and cooled to provide a product.

As an example, where the extruding method according to the present invention is applied to polypropylene, there is an apparatus comprising a resin feeding-melting section, in which a screw is a straight screw, a resin flow disturbing section including a torpedo or a ring valve mechanism, and a transfer section including a straight screw, for relaxing the resin stress. This apparatus, being simplified in mechanism and manufacture, can be used suitably.

(EMBODIMENTS OF THE INVENTION)

EMBODIMENTS 1-5

COMPARATIVE EXAMPLES 1-5

Polypropylene homopolymer (manufactured by Idemitsu Petrochemical Co., Ltd., Trade name: Idemitsu polypro F200S of the density $0.91/cm^3$, MI2.0 g/10 min., melting point 165° C.) has extruded by extruders (of 10 types) having the indications, in which the diameter (D) 50 mm, the total length (L) 1300 mm (L/D=26), the width of die 500 mm, and lip opening 2 mm are common to one another, and the sections A, B and C are different in type from one another, under the condition of the maximum cylinder temperature 260° C., the die temperature 280° C. and the screw speed 250 rpm, and a resin film-shaped member was obtained.

The resin extrusion flowrate (Kg/hr) during the respective extruding operations, the resin pressure (Kg/cm$^2$) at the die section, the resin temperature (°C.) and the load (A) of the driving motor were measured. Furthermore, variations at the forward end portion of the section C was measured to judge the extruding stability, an optotype is disposed behind a film extruded, the optotype is photographed through the film, and the transparency of the film was determined. As for the extruding stability and transparency, such indications were used that ⊙: excellent, ○: good, △: no good to some degree, and x: no good. Furthermore, the motor load/resin extrusion flow rate was made to be the energy efficiency of the apparatus, which is displayed.

The results from the above were shown collectively in Table 1.

TABLE 1

| | | FORMS OF SCREW | | | EXTRUSION FLOWRATE (O:Kg/hr) | RESIN PRESSURE (Kg/cm$^2$) |
|---|---|---|---|---|---|---|
| | | SECTION A | SECTION B | SECTION C | | |
| EMBODIMENTS | 1 | 18D, 4 mm STRAIGHT | 1D, 1 mm TORPEDO | 7D, 4 mm METERING | 69.0 | 65.0 |
| | 2 | 16D, 4 mm STRAIGHT | 2D, 1.5 mm TORPEDO | 8D, 4 mm METERING | 72.0 | 65.0 |
| | 3 | 17D, 4 mm STRAIGHT | 0.5D, 0.5 mm TORPEDO | 8.5D, 4 mm COMPRESSION RATIO 0.7 | 70.00 | 63.0 |
| | 4 | 9D, 8 mm STRAIGHT +8D, COMPRESSION RATIO 1.5 | 1D, 1 mm TORPEDO | 8D, 4 mm METERING | 69.0 | 60.0 |
| | 5 | 18D, 8 mm | 1D, | 7D, | 71.5 | 64.0 |

TABLE 1-continued

|  |  | COMPRESSION RATIO 1.5 | DULMAGE*1 | 4 mm METERING |  |  |
|---|---|---|---|---|---|---|
| COMPARATIVE EXAMPLES | 1 | 9D, 8 mm STRAIGHT + 9D, COMPRESSION RATIO 2 + 8D, DULMAGE*2 | | | 63.5 | 56.0 |
|  | 2 | 9D, 8 mm STRAIGHT + 10D, COMPRESSION RATIO 2 + 7D, 4 mm METERING | | | 61.0 | 70.0 |
|  | 3 | 9D, 8 mm STRAIGHT + 3D, COMPRESSION RATIO 3.5 + 14D, 2.3 mm METERING | | | 68.5 | 62.0 |
|  | 4 | 26D, 4 mm STRAIGHT | | | 75.0 | 79.0 |
|  | 5 | 18D, 4 mm STRAIGHT + 8D, DULMAGE*2 | | | 71.5 | 62.0 |

|  |  | RESIN TEMPERATURE (°C.) | MOTOR LOAD (A) | ENERGY EFFICIENCY (A/Q) | EXTRUDING STABILITY | TRANSPARENCY | OVERALL EVALUATION |
|---|---|---|---|---|---|---|---|
| EMBODIMENTS | 1 | 245 | 70 | 1.01 | ◯ | ◉ | ◉ |
|  | 2 | 250 | 90 | 1.25 | ◯ | ◯ | ◯ |
|  | 3 | 253 | 88 | 1.26 | ◯ | ◯ | ◯ |
|  | 4 | 255 | 91 | 1.32 | ◯ | ◯ | ◯ |
|  | 5 | 248 | 81 | 1.13 | ◯ | ◉ | ◉ |
| COMPARATIVE EXAMPLES | 1 | 265 | 106 | 1.67 | ◯ | X | X |
|  | 2 | 254 | 100 | 1.64 | X | Δ | X |
|  | 3 | 266 | 103 | 1.50 | Δ | X | X |
|  | 4 | 235 | 88 | 1.17 | X | Δ | X |
|  | 5 | 259 | 89 | 1.25 | ◯ | X | X |

*1: ANGLE OF TORSION 75°, NUMBER OF GROOVES 15, GROOVE DEPTH 4 mm, DIAMETER 49.8 mm
*2: DULMAGE 8 UNIT OF *1

EMBODIMENT 6

Homopolypropylene resin (the density: 0.91 g/cm$^3$, MI: 2.1 g/10 min, melting point: 165° C., manufactured by Idemitsu Petrochemical Co., Ltd., Trade name: Idemitsu polypro F200S) was kneaded in the molten state by use of the following extruder at the resin temperature 240° C. and die lip temperature 280° C. and extruded to provide a transparent molten resin film-shaped material.

Figure 4:
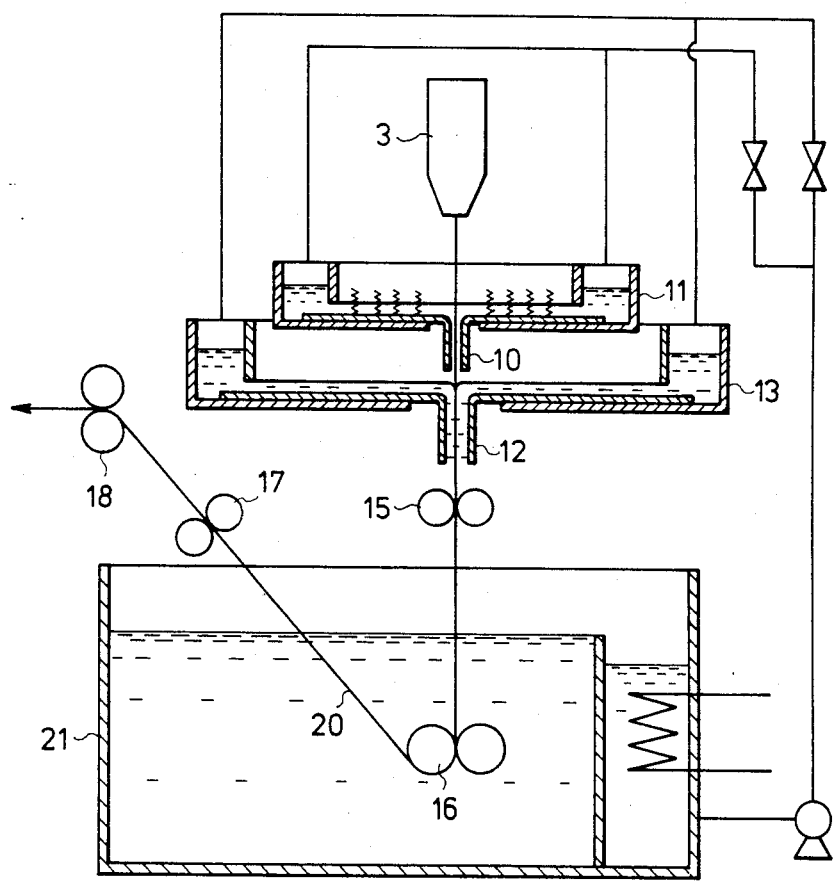
FIG. 4 shows the water cooling device used when a sheet is formed by use of the apparatus according to the present invention.

The extruder: Diameter 65 mm
L/D: 28
Screw: D=Outer diameter
  The section A: 18D, 4.5 mm straight
  The section B: 0.5D, 1.2 mm torpedo
  The section C: 10D, 3.5 mm straight
Die:
  Width 400 mm
  Lip opening 2 mm
  Lip heater Heating die Subsequently, this film-shaped material was introduced into a two-stage water-cooling device shown in FIG. 4 (Japanese Patent Kokai (Laid-Open) No. 203018/1983) (The height of a first stage slit 10 was 50 mm, the width thereof was 2.5 mm, the water level of a water tank 11 above the slit was 5 mm, cooling water temperature was 5° C., four-stage flow regulating member were used; the height of a second stage slit 12 was 10 mm, the width thereof was 5 mm, the water level of a (60 mesh metal double screen) water tank 13 below the slit was 10 mm, cooling water temperature was 5° C., and a cooling water tank 21 was provided) and quenched, whereby a sheet 20 was formed by rollers 15 to 18 at a haul-off speed 15 mm/min, and a polypropylene sheet having a thickness 0.25 mm was obtained. The physical properties of the sheet thus obtained are shown in Table 2.

EMBODIMENT 7

Polypropylene used in the embodiment 6 was replaced by homopropylene resin (the density: 0.91 g/cm$^3$, MI: 8.5 g/10 min. melting point 170° C., manufactured by Idemitsu Petrochemical Co., Ltd., Trade name: Idemitsu polypro F700N) and all of the factors other than the above were made identical with those in the embodiment 6, and a polypropylene sheet was obtained. The physical properties of the sheet thus obtained are shown in Table 2.

TABLE 2

|  | TOTAL HAZE | | SURFACE | TENSILE |
|---|---|---|---|---|
|  | ( ) OUTER HAZE *1 (%) | 120° C. ANNEALING | GLUSSINESS *2 (%) | STRENGTH (MD/ID) *3 (Kg/cm$^3$) |
| EMBODIMENT 6 | 8 (2.0) | 2.5 (2.0) | 125 | 434/441 |
| EMBODIMENT 7 | 6 (1.8) | 2.3 (1.8) | 130 | 455/400 |

*1 ASTM D 1003
*2 ASTM D 523
*3 ASTM JIS K 6758

As apparent from the results shown in the Tables, when the apparatus and the method according to the present invention are applied, the heat generated by viscous energy dissipation becomes low, and moreover, the extrusion flowrate is increased, so that the high speed extrusion can be carried out. This is useful in that the resin is prevented from being deteriorated and the extrusion at the constant temperature can be performed. Furthermore, the extruding stability is good, so that the variability in wall thickness of the products can be decreased. Further, the resin pressure is low. Furthermore, the swell in the die is reduced, whereby ununiformities caused by cooling are suppressed, the surface of the product obtained is uniform and excellent in glossiness, and the film-shaped material becomes good in transparency.

As has been described hereinabove, the apparatus and the method according to the present invention can produce the thermoplastic resin products excellent in properties efficiently with a low driving force and can be applied to the extrusion molding of the sheet, the film and blow molded articles and the industrial value thereof is high.

What is claimed is:

1. A method of extruding thermoplastic resin in a transparent condition through an extruder including a screw and a cylinder, the steps of said method comprising:
- passing said thermoplastic resin through a feeding-melting section having a compression ratio of 0.5-2;
- passing said resin through a resin flow disturbing section selected by any one of a torpedo, a Dulmage and a ring valve; and thereafter
- passing said resin through a stress relaxing section including a helical screw having a compression ratio 0.5-2.

2. A method of extruding thermoplastic resin as set forth in claim 1, wherein said thermoplastic resin is one of polypropylene, linear low-density polyethylene, polycarbonate and polystyrene.

3. A method of extruding thermoplastic resin as set forth in claim 1, wherein said resin flow disturbing section is a combination of a mechanism on said screw with a cylinder inner wall construction.

4. A method of extruding thermoplastic resin as set forth in claim 1, wherein the sectional length of said resin stress relaxing section is 4-15 times the diameter of said cylinder.

5. A method for extruding thermoplastic resin as set forth in claim 1, wherein the length of said resin flow disturbing section is 0.1-3 times the diameter of said cylinder.

6. An apparatus for extruding thermoplastic resin in a transparent condition, comprising:
- a screw and a cylinder therefor, said screw including:
- a resin feed-melting secton comprising a helical screw having a compression ratio of 0.5-2;
- a resin flow disturbing section axially following said feed-melting section, selected by any one of a torpedo, a Dulmage and a ring valve;
- a transfer section axially following said flow disturbing section, comprising a helical screw having a compression ratio of 0.5-2; and
- a die for extruding said resin transferred from said transfer section in a predetermined shape.

7. An apparatus for extruding thermoplastic resin as set forth in claim 6, wherein said resin flow disturbing section is a combination of said mechanism on the screw with a suitable recess construction formed on the cylinder inner wall.

8. An apparatus for extruding thermoplastic resin as set forth in claim 6, wherein the ratio between the mean space sectional areas across the screw and the cylinder of said resin flow disturbing section and said resin feeding section is 1:2-1:10.

9. An apparatus for extruding thermoplastic resin as set forth in claim 6, wherein said resin flow disturbing section comprises equipment including a ring valve mechanism and an axially movable screw, so that fluidic resistance is regulatable.

10. An apparatus for extruding thermoplastic resin as set forth in claim 6, wherein the length of said resin flow disturbing section is 0.1-3 times the diameter of said cylinder.

11. An apparatus for extruding thermoplastic resin as set forth in claim 6, wherein said resin transfer section for relaxing the stress comprises at least one of a helical screw, a rod without helixes, a non-screw section only with a cylinder.

12. An apparatus for extruding thermoplastic resin as set forth in claim 6, wherein the length of said resin transfer section is 4-15 times the diameter of said cylinder.

13. An apparatus for extruding thermoplastic resin as set forth in claim 6, wherein said resin transfer section for relaxing the stress is provided between a mechanism comprising a screw and a cylinder and said die with a pipe and/or a gear pump.

14. An apparatus for extruding thermoplastic resin as set forth in claim 6, wherein the ratio (L/D) between the total length (L) and the diameter (D) of said screw of the extruder is 15-35.

15. An apparatus for extruding thermoplastic resin as set forth in claim 6, wherein said screw of the extruder comprises:
- a resin feeding-melting section including a straight screw;
- a resin flow disturbing section including at least one of a torpedo mechanism and a ring valve mechanism; and
- a transfer section including a straight screw, for relaxing the resin stress.

16. An apparatus for extruding thermoplastic resin as set forth in claim 6, wherein the ratio (H/h) between the depth of screw channel (H) of said straight screw and a space (h) formed between at least one of a torpedo and a ring valve mechanism portion and said cylinder is 2-10.

17. An apparatus for extruding thermoplastic resin as set forth in claim 6, wherein said cylinder of the resin feeding section of the extruder is formed with a grooved liner in the axial direction thereof.

* * * * *